US012651182B2

(12) United States Patent  (10) Patent No.: US 12,651,182 B2
Xu et al.  (45) Date of Patent: Jun. 9, 2026

(54) IDENTIFYING TRAITS OF PARTITIONED GROUP FROM IMBALANCED DATASET

(71) Applicant: International Business Machines Corporation, Armonk, NY (US)

(72) Inventors: Jing James Xu, Xi'an (CN); Xue Ying Zhang, Xi'an (CN); Jing Xu, Xi'an (CN); Si Er Han, Xi'an (CN); Dong Hai Yu, Xi'an (CN); Xiao Ming Ma, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 17/356,913

(22) Filed: Jun. 24, 2021

(65) Prior Publication Data

US 2022/0414504 A1     Dec. 29, 2022

(51) Int. Cl.
*G06N 7/00* (2023.01)
*G06N 20/00* (2019.01)

(52) U.S. Cl.
CPC .............. *G06N 7/00* (2013.01); *G06N 20/00* (2019.01)

(58) Field of Classification Search
CPC .................................. G06N 7/00; G06N 20/00
See application file for complete search history.

(56) References Cited

U.S. PATENT DOCUMENTS 10,402,726 B1 * 9/2019 Moore ..................... G06N 7/01
10,417,643 B2   9/2019 Sri et al.

2015/0081520 A1   3/2015 Brereton et al.
2019/0378197 A1  12/2019 Leong et al.
2021/0065029 A1   3/2021 Zhang et al.
(Continued)

FOREIGN PATENT DOCUMENTS

CN     108874927 A * 11/2018 ............. G06F 21/55
CN     109636457 A   4/2019
WO   WO-2020037244 A1 * 2/2020 ............. G06N 20/00

OTHER PUBLICATIONS

Ebenuwa, Solomon H., et al. "Variance ranking attributes selection techniques for binary classification problem in imbalance data." IEEE access 7 (2019): 24649-24666. (Year: 2019).*

(Continued)

*Primary Examiner* — Vincent Gonzales
(74) *Attorney, Agent, or Firm* — Edward J. Wixted, III

(57) ABSTRACT

A computer-implemented method, system and computer program product for detecting feature traits from an imbalanced dataset. A first regression model is built based on a simulated dataset to compute contribution scores for the features to make a target a positive case. A variance in the features' original values for each feature of the first set of features (those features with contribution scores for positive cases that exceed a threshold value) between the positive and negative cases is determined. A second regression model is built to calculate a predictor importance value for a second set of features (features from the first set of features with a variance in their original values for both positive and negative cases that exceeds a threshold value). Feature traits are then extracted from a group of clustered positive cases with features of the second set of features containing a predictor importance value exceeding a threshold value.

20 Claims, 9 Drawing Sheets

(56) References Cited

U.S. PATENT DOCUMENTS

2022/0398490 A1    12/2022  Han et al.

OTHER PUBLICATIONS

Esposito, Carmen, et al. "GHOST: adjusting the decision threshold to handle imbalanced data in machine learning." Journal of Chemical Information and Modeling 61.6 (2021): 2623-2640. (Year: 2021).*

Kwon, Jung-Hyok, and Eui-Jik Kim. "Failure prediction model using iterative feature selection for industrial internet of things." Symmetry 12.3 (2020): 454. (Year: 2020).*

Zhang, Bei, Luquan Wang, and Yuanyuan Li. "Precision Marketing Method of E-Commerce Platform Based on Clustering Algorithm." Complexity 2021.1 (2021): 5538677. (Year: 2021).*

Chornous, Galyna, Kostiantyn Pysanets, and Nataliia Yakovenko. "A Hybrid Approach for Feature Selection in Data Mining Modeling of Credit Scoring." ICTERI Workshops. 2020. (Year: 2020).*

Barboza, Flavio, Herbert Kimura, and Edward Altman. "Machine learning models and bankruptcy prediction." Expert Systems with Applications 83 (2017): 405-417. (Year: 2017).*

Wang, Huanjing, and Taghi M. Khoshgoftaar. "Measuring stability of threshold-based feature selection techniques." 2011 IEEE 23rd International Conference on Tools with Artificial Intelligence. IEEE, 2011. (Year: 2011).*

James G, Witten D, Hastie T, Tibshirani R. An introduction to statistical learning. New York: springer; Jun. 2013, corrected 8th printing 2017. 441 pages. (Year: 2017).*

* cited by examiner

100

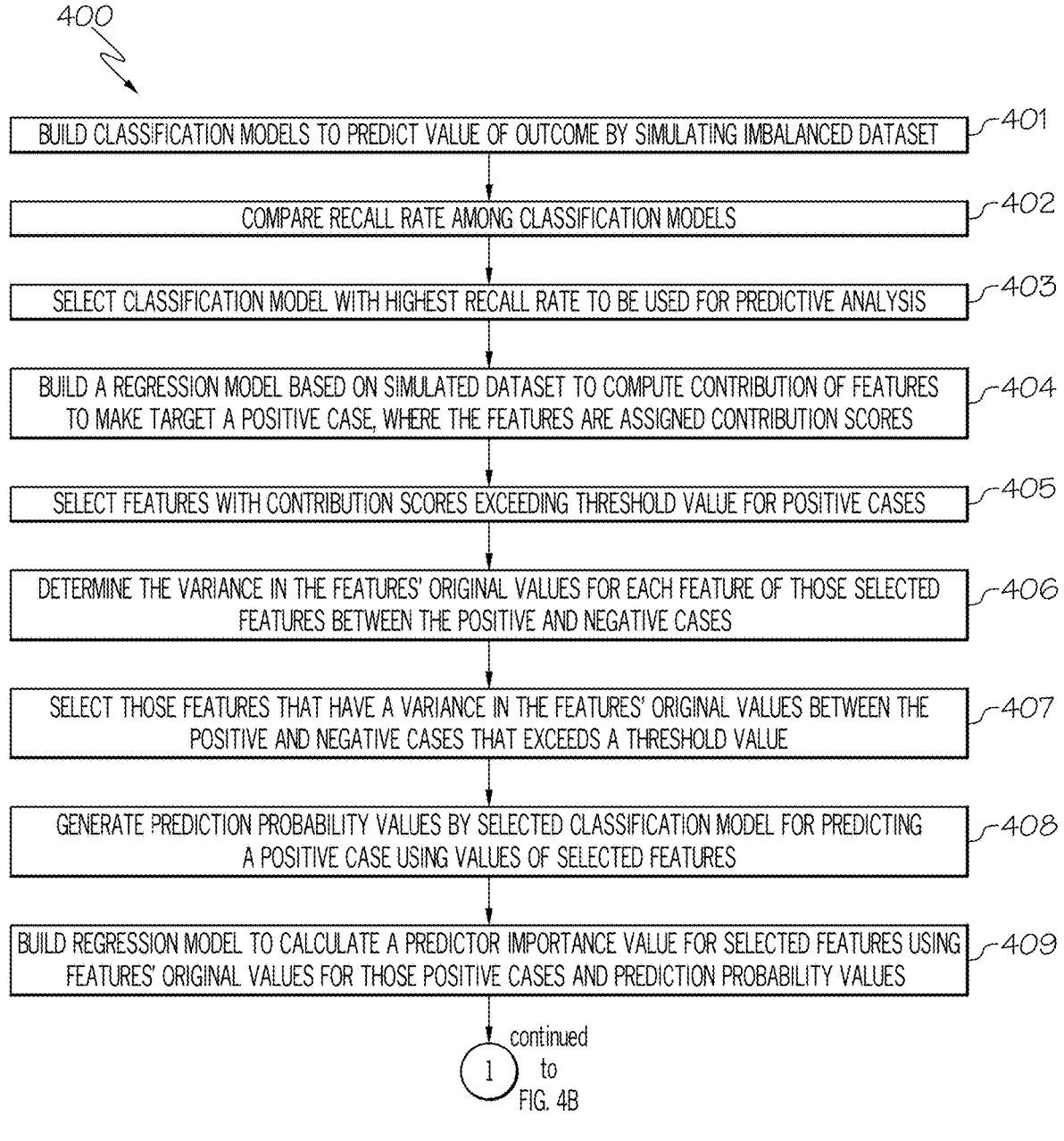

400

401 — BUILD CLASSIFICATION MODELS TO PREDICT VALUE OF OUTCOME BY SIMULATING IMBALANCED DATASET

402 — COMPARE RECALL RATE AMONG CLASSIFICATION MODELS

403 — SELECT CLASSIFICATION MODEL WITH HIGHEST RECALL RATE TO BE USED FOR PREDICTIVE ANALYSIS

404 — BUILD A REGRESSION MODEL BASED ON SIMULATED DATASET TO COMPUTE CONTRIBUTION OF FEATURES TO MAKE TARGET A POSITIVE CASE, WHERE THE FEATURES ARE ASSIGNED CONTRIBUTION SCORES

405 — SELECT FEATURES WITH CONTRIBUTION SCORES EXCEEDING THRESHOLD VALUE FOR POSITIVE CASES

406 — DETERMINE THE VARIANCE IN THE FEATURES' ORIGINAL VALUES FOR EACH FEATURE OF THOSE SELECTED FEATURES BETWEEN THE POSITIVE AND NEGATIVE CASES

407 — SELECT THOSE FEATURES THAT HAVE A VARIANCE IN THE FEATURES' ORIGINAL VALUES BETWEEN THE POSITIVE AND NEGATIVE CASES THAT EXCEEDS A THRESHOLD VALUE

408 — GENERATE PREDICTION PROBABILITY VALUES BY SELECTED CLASSIFICATION MODEL FOR PREDICTING A POSITIVE CASE USING VALUES OF SELECTED FEATURES

409 — BUILD REGRESSION MODEL TO CALCULATE A PREDICTOR IMPORTANCE VALUE FOR SELECTED FEATURES USING FEATURES' ORIGINAL VALUES FOR THOSE POSITIVE CASES AND PREDICTION PROBABILITY VALUES

FIG. 4A

IDENTIFYING TRAITS OF PARTITIONED GROUP FROM IMBALANCED DATASET

TECHNICAL FIELD

The present disclosure relates generally to machine learning, and more particularly to identifying traits of a partitioned group from an imbalanced dataset.

BACKGROUND

Machine learning is the scientific study of algorithms and statistical models that computer systems use in order to perform a specific task effectively without using explicit instructions, relying on patterns and inference instead. Machine learning algorithms build a mathematical model based on sample data, known as "training data," in order to make predictions or decisions without being explicitly programmed to perform the task.

SUMMARY

In one embodiment of the present disclosure, a computer-implemented method for detecting feature traits from an imbalanced dataset comprises building a first regression model based on a simulated dataset to compute contribution of features to make a target a positive case, where the features are assigned contribution scores. The method further comprises selecting a first set of features with contribution scores exceeding a first threshold value for positive cases. The method additionally comprises determining a variance in features' original values for each feature of the first set of features between positive and negative cases. Furthermore, the method comprises selecting a second set of features corresponding to those features of the first set of features with a variance in original values between the positive and negative cases that exceeds a second threshold value. Additionally, the method comprises generating prediction probability values by a classification model for predicting a positive case using values of the selected second set of features. In addition, the method comprises building a second regression model to calculate a predictor importance value for the selected second set of features using original values of the selected second set of features for the positive cases and the prediction probability values. The method further comprises extracting feature traits from a group of clustered positive cases with features of the selected second set of features containing a predictor importance value exceeding a third threshold value. The method additionally comprises generating a summary of the extracted feature traits for the group of clustered positive cases.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIGS. 4A-4B are a flowchart of a method for detecting feature traits from an imbalanced dataset in accordance with an embodiment of the present disclosure;

DETAILED DESCRIPTION

Figure 1:
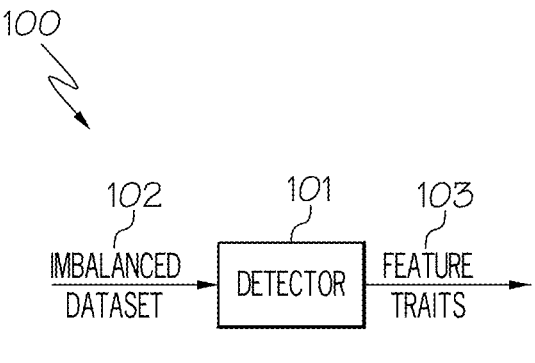
FIG. 1 illustrates an embodiment of the present disclosure of a communication system for detecting feature traits from an imbalanced dataset.

As stated in the Background section, machine learning is the scientific study of algorithms and statistical models that computer systems use in order to perform a specific task effectively without using explicit instructions, relying on patterns and inference instead. Machine learning algorithms build a mathematical model based on sample data, known as "training data," in order to make predictions or decisions without being explicitly programmed to perform the task.

There are two approaches to machine learning: supervised and unsupervised. In a supervised model, a training dataset is fed into a classification algorithm. Classification algorithms are predictive calculations used to assign data to preset categories by analyzing sets of training data.

Currently, classification algorithms are built to attempt to detect the feature traits of a group, such as the traits of customers with high net worth. In such classification algorithms, the feature with the highest predictor importance value (value corresponding to the importance in predicting an outcome) is selected as corresponding to the feature trait of the group. Such information is valuable, such as to marketing, in attempting to identify and target customers with high net worth to purchase a good or service.

Unfortunately, such classification algorithms have a low recall rate (referring to the number of correct positive predictions divided by the total number of positive cases). As a result, the classification algorithms are unsuccessful in correctly identifying the feature traits of a group.

Furthermore, such predictor importance values do not focus on the accuracy of the contribution of the feature in predicting the outcome, such as the traits for making a customer a high net worth customer.

Consequently, current classification algorithms fail to accurately detect the feature traits of a group, such as the traits of customers with high net worth.

The embodiments of the present disclosure provide a means for accurately detecting the feature traits of a group, such as the traits of customers with high net worth.

In some embodiments of the present disclosure, the present disclosure comprises a computer-implemented method, system and computer program product for detecting feature traits from an imbalanced dataset. In one embodiment of the present disclosure, a first regression model is built based on a simulated dataset to compute the contribution of the features to make a target a positive case (e.g., target has a value of "1"), where the features are assigned contribution scores. A "regression model," as used herein, refers to a model to perform regression analysis, which is a set of statistical processes for estimating the relationships between a dependent variable (the outcome variable, such as the target) and the one or more independent variables (often called "predictors," "covariates," or "features"). In one embodiment, weights (contribution scores) are assigned to each independent variable (features) in the model that are relative to the other independent variables in the analysis. Those features with contribution scores for positive cases that exceed a threshold value are then selected ("first set of selected features"). The variance in the features' original values for each feature of those selected features ("first set of selected features") between the positive and negative cases is determined. Those features that have a variance in the features' original values between the positive and negative cases that exceeds a threshold value are then selected ("second set of selected features"). Prediction probability values are then generated by a classification model that was selected as having the highest recall rate using the values of the second set of selected features. A prediction probability value, as used herein, refers to a value that indicates the probability of the target being a positive or a negative case (e.g., having a value of one which signifies a high net worth individual or having a value of zero which indicates that the individual is not a high net worth individual, respectively) based on the values of the selected features, such as the values of the selected inputs which represent various features (e.g., credit rating, home ownership, real estate owned, married). A second regression model is then built to calculate a predictor importance value for the second set of selected features using the features' original values for those positive cases as well as the prediction probability values. A "predictor importance value," as used herein, refers to a value corresponding to the importance of the feature in predicting an outcome. Feature traits are then extracted from a group of clustered positive cases with the features of the second set of selected features containing a predictor importance value exceeding a threshold value. For example, the extracted feature traits correspond to the traits of those features of the second set of selected features with a predictor importance value exceeding a threshold value, such as the traits (e.g., credit scores) for such features (e.g., credit rating). Such extracted information is used to provide detailed information about the target (e.g., high net worth individual). A summary of the extracted feature traits of the group is then generated. After such information is provided to a user, such information may be utilized by a marketing department to develop a marketing strategy, such as to more effectively target high net worth individuals. In this manner, feature traits of a group, such as the traits of customers with high net worth, are more accurately detected.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for detecting feature traits from an imbalanced dataset. As shown in FIG. 1, communication system 100 includes a detector 101 that receives an imbalanced dataset 102 and identifies the feature traits 103 from such an imbalanced dataset 102 as discussed herein. An "imbalanced dataset" 102, as used herein, refers to a classification problem in which the class distribution is not uniform among the classes, such as the majority (negative) class and the minority (positive) class. "Feature traits" 103, as used herein, refer to the qualities and characteristics (e.g., buying and holding investments, optimistic) of customers that result in positive classification cases (e.g., high net worth individuals).

A description of the software components of detector 101 used to detect such feature traits 103 is provided below in connection with FIG. 2. A description of the hardware configuration of detector 101 is provided further below in connection with FIG. 3.

Figure 2:
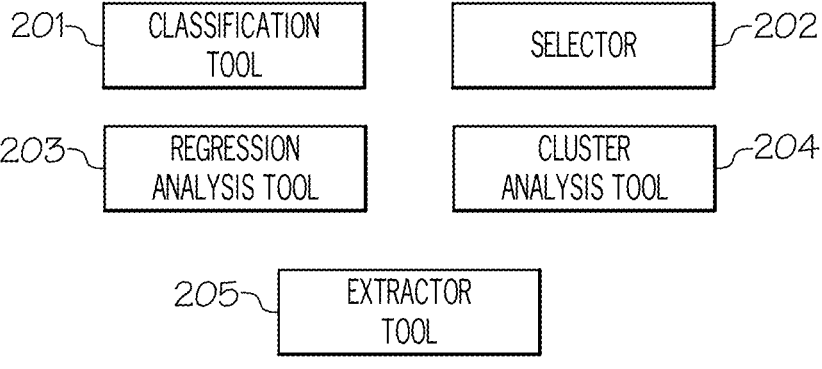
FIG. 2 is a diagram of the software components of a detector used to detect feature traits from an imbalanced dataset in accordance with an embodiment of the present disclosure.

FIG. 2 is a diagram of the software components of detector 101 (FIG. 1) used to detect feature traits 103 (FIG. 1) from an imbalanced dataset 102 (FIG. 1) in accordance with an embodiment of the present disclosure.

Referring to FIG. 2, in conjunction with FIG. 1, detector 101 includes a classification tool 201 configured to build classification models to predict a value of an outcome by simulating imbalanced dataset 102. Various types of classification models may be built, such as logistic regression, naïve Bayes, stochastic gradient descent, k-nearest neighbors, decision tree, random forest and support vector machine. In one embodiment, the built classification models include a deep learning model, such as a convolutional neural network. In one embodiment, the built classification models include an ensemble model, such as XGBoost, random forest, etc. In one embodiment, the built classification models include a traditional classification model, such as support vector machine, trees, etc. In one embodiment, the built classification models include a composite model, such as a decision tree with logistic regression, support vector machine with a generalized linear mixed model, etc.

In one embodiment, one of the built classification models will be selected to provide prediction probability values. A prediction probability value, as used herein, refers to a value that indicates the probability of the target being a positive or a negative case (e.g., having a value of one which signifies a high net worth individual or having a value of zero which indicates that the individual is not a high net worth individual, respectively) based on the values of the selected features, such as the values of the selected inputs which represent various features (e.g., credit rating, home ownership, real estate owned, married).

In one embodiment, the goal of the selected classification model is to accurately predict the target class for each case in the dataset. For example, the selected classification model could be used to identify targets as being high net worth individuals (value of "1") or not high net worth individuals (value of "0").

In one embodiment, a classification task begins with a dataset in which the class assignments are known. For example, a classification model may predict high net worth individuals based on observed data over a period of time, such as loan information, historical credit rating, employment history, home ownership or rental, years of residence, number and type of investments, etc.

In one embodiment, the classification problem solved by the selected classification model is binary classification. In binary classification, the target attribute has only two possible values: for example, the target being a high net worth individual (value of "1") or not a high net worth individuals (value of "0").

Detector 101 further includes a selector 202 configured to compare a recall rate among the built classification models and select the classification model among the built classification models with the highest recall rate to be used for predictive analysis (provide prediction probability values) as discussed further below. A "recall rate," as used herein, corresponds to a number of correct positive predictions divided by a total number of positives (positive cases). For example, the recall rate=(TP/(TP+FN)), where TP corresponds to the number of true positives and FN corresponds to the number of false negatives. A "true positive" refers to a positive result (positive case) that is correctly classified and "false negative" refers to a negative result (negative case) that is incorrectly classified.

Furthermore, in one embodiment, selector 202 is configured to select the features with a contribution score for positive cases that exceeds a threshold value, which may be user-selected.

Additionally, in one embodiment, selector 202 is configured to determine the variance in the features' original values of selected features between the positive and negative cases (e.g., cases in which the target is "1" and cases in which the target is "0," respectively).

Furthermore, in one embodiment, selector 202 is configured to select those features with a variance in the features' original values between the positive and negative cases that exceeds a threshold value, which may be user-selected.

Detector 101 additionally includes a regression analysis tool 203 configured to build a regression model based on a simulated dataset (based on the positive case being analyzed) to compute the contribution of the features to make the target a positive case, where the features are assigned contribution scores.

A "regression model," as used herein, refers to a model to perform regression analysis, which is a set of statistical processes for estimating the relationships between a dependent variable (the outcome variable, such as the target) and the one or more independent variables (often called "predictors," "covariates," or "features"). In one embodiment, the dependent variable corresponds to the "target," which, in one example, corresponds to an indication as to whether the individual is a high net worth individual (value of "1") or not (value of "0"). In one embodiment, the independent variables correspond to various features, such as loan information, historical credit rating, employment history, home ownership or rental, years of residence, number and type of investments, etc. that are used to determine whether there is a positive case (e.g., target having a value of "1" to indicate that the individual is a high net worth individual).

In one embodiment, the regression analysis corresponds to linear regression, which corresponds to a linear approach to modeling the relationship between a scalar response and explanatory variables (dependent and independent variables).

In one embodiment, the regression analysis performed by the regression model is configured to maximize prediction accuracy. As a result, weights (contribution scores) are assigned to each independent variable (feature) in the model that are relative to the other independent variables in the analysis. In such a regression analysis, the regression analysis corresponds to a multiple regression analysis in which several independent variables (features) in combination are used to predict or explain the outcome dependent variable (the target). In one embodiment, the weights (contribution scores) correspond to a value between 0 and 1.

In one embodiment, regression analysis tool 203 is further configured to build a regression model to calculate a predictor importance ("PI") value of the selected features using the features' original values for the positive cases (e.g., cases that indicate the target having a value of "1" which corresponds to a high net worth individual) and prediction probability values (discussed above). A "predictor importance value," as used herein, refers to a value corresponding to the importance of the feature in predicting an outcome. In one embodiment, such a value is normalized between the values of 0 and 1.

In one embodiment, regression analysis tool 203 utilizes the IBM® SPSS Modeler to calculate the predictor importance value of the selected features using the features' original values (e.g., training data, testing data) for the positive cases (e.g., cases that indicate the target having a value of "1" which corresponds to a high net worth individual) and prediction probability values (discussed above).

Furthermore, detector 101 includes a cluster analysis tool 204 configured to cluster the positive cases generated by the selected classification model into a group using those features with a prediction importance value exceeding a threshold value. A cluster analysis or clustering, as used herein, is the task of grouping a set of features with a predictor importance value that exceeds a threshold value in such a way that the features in the same group (called a cluster) are used to provide a positive case (e.g., target having a value of "1," which indicates a high net worth individual). In one embodiment, cluster analysis tool 204 utilizes any of the following clustering techniques to cluster the positive cases of the selected classification model into a group using those features with a predictor importance value exceeding a threshold value as inputs, such as hierarchical clustering, fuzzy clustering, centroid-based clustering, distribution-based clustering, density-based clustering, and grid-based clustering.

In one embodiment, cluster analysis tool 204 utilizes a clustering algorithm that clusters those features with a predictor importance value exceeding a threshold value. In one embodiment, such a clustering algorithm is one or more of the following: affinity propagation, agglomerative clustering, BIRCH (Balanced Iterative Reducing and Clustering using Hierarchies), k-means, mean shift, spectral clustering, OPTICS (Ordering Points To Identify the Clustering Structure), etc.

Additionally, detector 101 includes an extractor tool 205 configured to extract the feature traits from the group discussed above. For example, the extracted feature traits correspond to the traits of those features in the group (features with a predictor importance value exceeding a threshold value), such as the traits (e.g., credit scores) for such features (e.g., credit rating). Other feature traits include, but not limited to, loan information, historical credit rating, employment history, home ownership or rental, years of residence, number and type of investments, etc. Such information may be extracted from those features in the group which is used to provide detailed information about the target (e.g., high net worth individual). Such information (feature traits) may be summarized in a summary that is provided to a user of detector 101 by extractor tool 205. For example, such information may be presented graphically to the user, such as via the display of detector 101.

In one embodiment, extractor tool 205 utilizes a data visualization tool for converting the extracted feature traits into a graphic format (e.g., charts, tables, graphs, maps, infographics, dashboards, etc.). Examples of such a data visualization tool include, but not limited to, Tableau®, Looker®, IBM® Cognos Analytics, Sisense®, Microsoft® Power BI®, Domo®, etc.

Furthermore, after such information is provided to the user of detector 101, such information may be utilized by a marketing department to develop a marketing strategy to more effectively target high net worth individuals. In one embodiment, extractor tool 205 utilizes a marketing planning tool, such as Trello®, Wrike®, IBM® Marketing Cloud, Percolate®, SendX, Husky Marketing Planner, Mediatool, etc., to develop a marketing strategy using such information.

A further description of these and other functions is provided below in connection with the discussion of the method for detecting feature traits from an imbalanced dataset.

Prior to the discussion of the method for detecting feature traits from an imbalanced dataset, a description of the hardware configuration of detector 101 (FIG. 1) is provided below in connection with FIG. 3.

Figure 3:
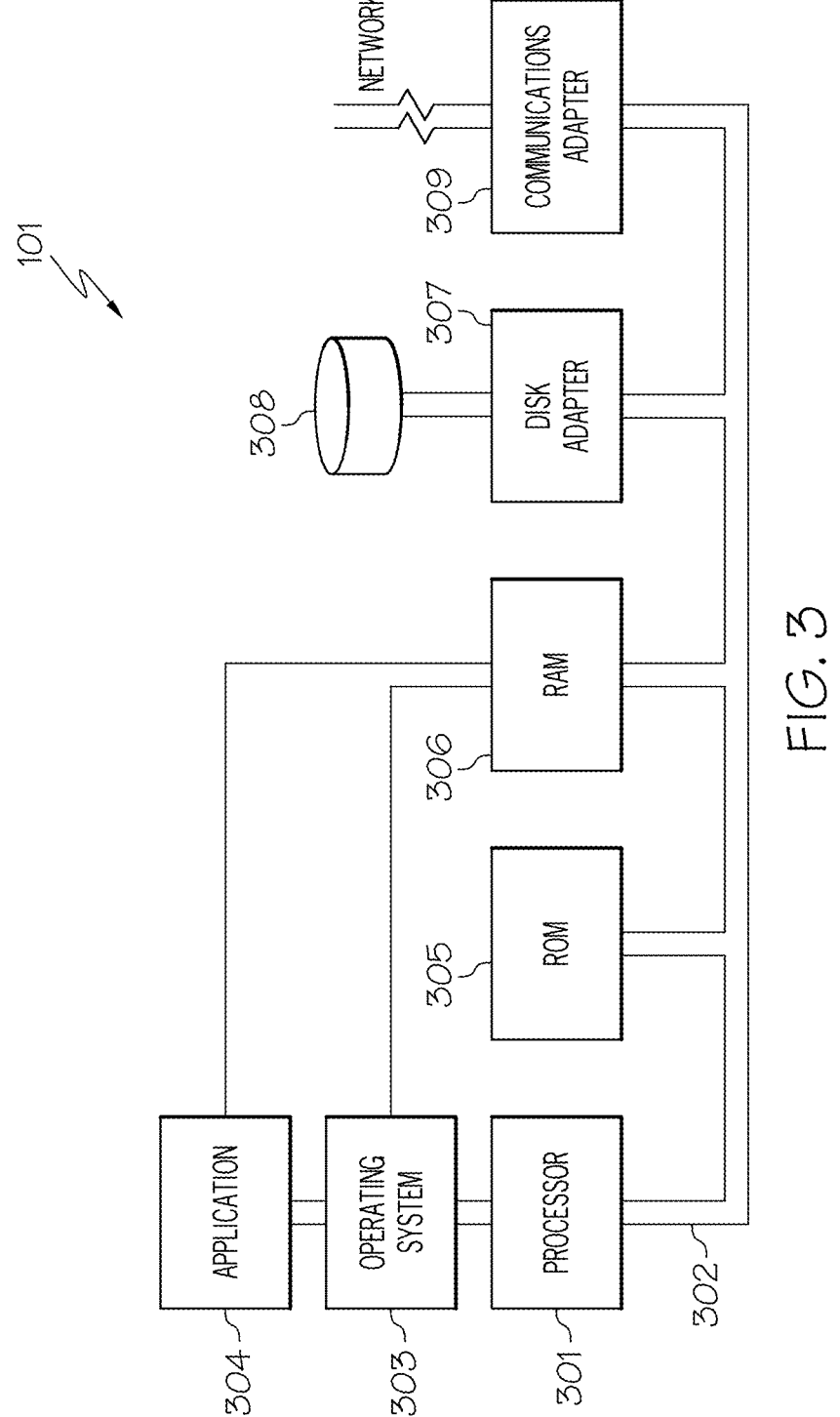
FIG. 3 illustrates an embodiment of the present disclosure of the hardware configuration of the detector which is representative of a hardware environment for practicing the present disclosure.

Referring now to FIG. 3, FIG. 3 illustrates an embodiment of the present disclosure of the hardware configuration of detector 101 (FIG. 1) which is representative of a hardware environment for practicing the present disclosure.

Detector 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, classification tool 201 (FIG. 2), selector 202 (FIG. 2), regression analysis tool 203 (FIG. 2), cluster analysis tool 204 (FIG. 2) and extractor tool 205 (FIG. 2). Furthermore, application 304 may include, for example, a program for detecting feature traits from an imbalanced dataset as discussed further below in connection with FIGS. 4A-4B and 5-9.

Referring again to FIG. 3, read-only memory ("ROM") 305 is connected to system bus 302 and includes a basic input/output system ("BIOS") that controls certain basic functions of detector 101. Random access memory ("RAM") 306 and disk adapter 307 are also connected to system bus 302. It should be noted that software components including operating system 303 and application 304 may be loaded into RAM 306, which may be detector's 101 main memory for execution. Disk adapter 307 may be an integrated drive electronics ("IDE") adapter that communicates with a disk unit 308, e.g., disk drive. It is noted that the program for detecting feature traits from an imbalanced dataset, as discussed further below in connection with FIGS. 4A-4B and 5-9, may reside in disk unit 308 or in application 304.

Detector 101 may further include a communications adapter 309 connected to bus 302. Communications adapter 309 interconnects bus 302 with an outside network to communicate with other devices.

In one embodiment, application 304 of detector 101 includes the software components of classification tool 201, selector 202, regression analysis tool 203, cluster analysis tool 204 and extractor tool 205. In one embodiment, such components may be implemented in hardware, where such hardware components would be connected to bus 302. The functions discussed above performed by such components are not generic computer functions. As a result, detector 101 is a particular machine that is the result of implementing specific, non-generic computer functions.

In one embodiment, the functionality of such software components (e.g., classification tool 201, selector 202, regression analysis tool 203, cluster analysis tool 204 and extractor tool 205) of detector 101, including the functionality for detecting feature traits from an imbalanced dataset, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, currently, classification algorithms are built to attempt to detect the feature traits of a group, such as the traits of customers with high net worth. In such classification algorithms, the feature with the highest predictor importance value (value corresponding to the importance in predicting an outcome) is selected as corresponding to the feature trait of the group. Such information is valuable, such as to marketing, in attempting to identify and target customers with high net worth to purchase a good or service. Unfortunately, such classification algorithms have a low recall rate (referring to the number of correct positive predictions divided by the total number of positive cases). As a result, the classification algorithms are unsuccessful in correctly identifying the feature traits of a group. Furthermore, such predictor importance values do not focus on the accuracy of the contribution of the feature in predicting the outcome, such as the traits for making a customer a high net worth customer. Consequently, current classification algorithms fail to accurately detect the feature traits of a group, such as the traits of customers with high net worth.

Figure 4B:
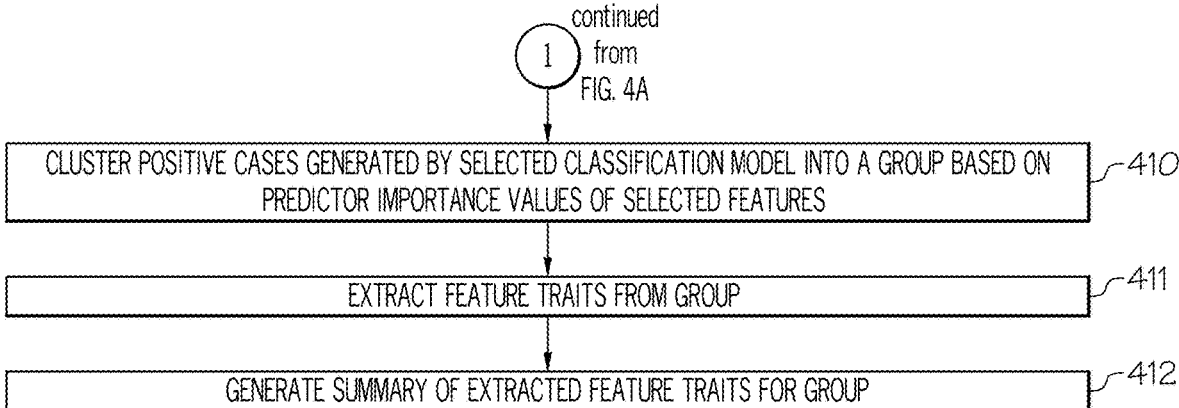
Figure 5:
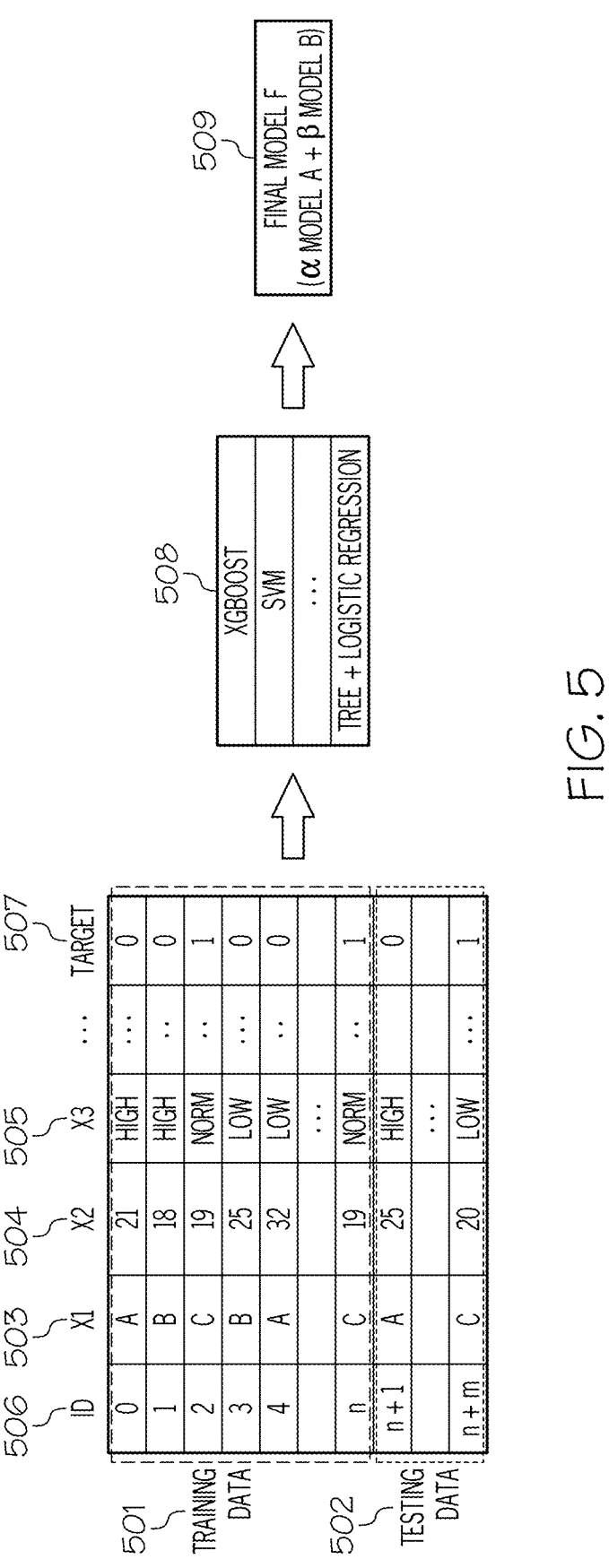
FIG. 5 illustrates comparing the recall rate for the various built classification models and selecting the classification model with the highest recall rate to be used for predictive analysis in accordance with an embodiment of the present disclosure.
Figure 6:
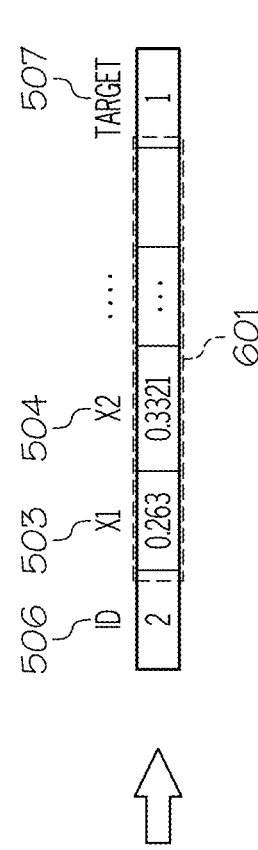
FIG. 6 illustrates the weights (contribution scores) assigned to the features by the regression model in accordance with an embodiment of the present disclosure.
Figure 6:
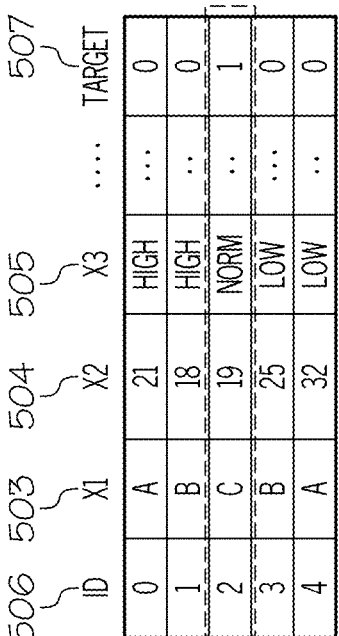
Figure 7:
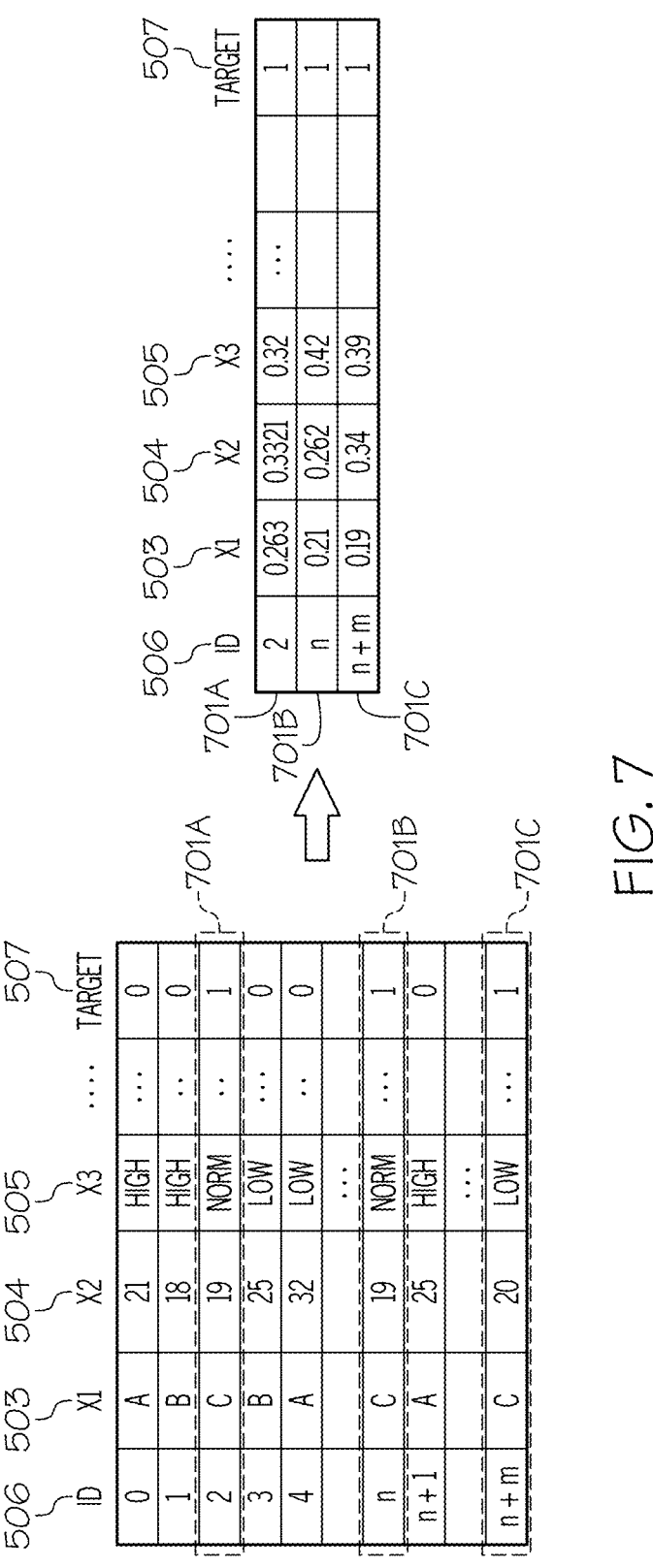
FIG. 7 illustrates the contribution scores for various features for the positive cases in accordance with an embodiment of the present disclosure.
Figure 8:
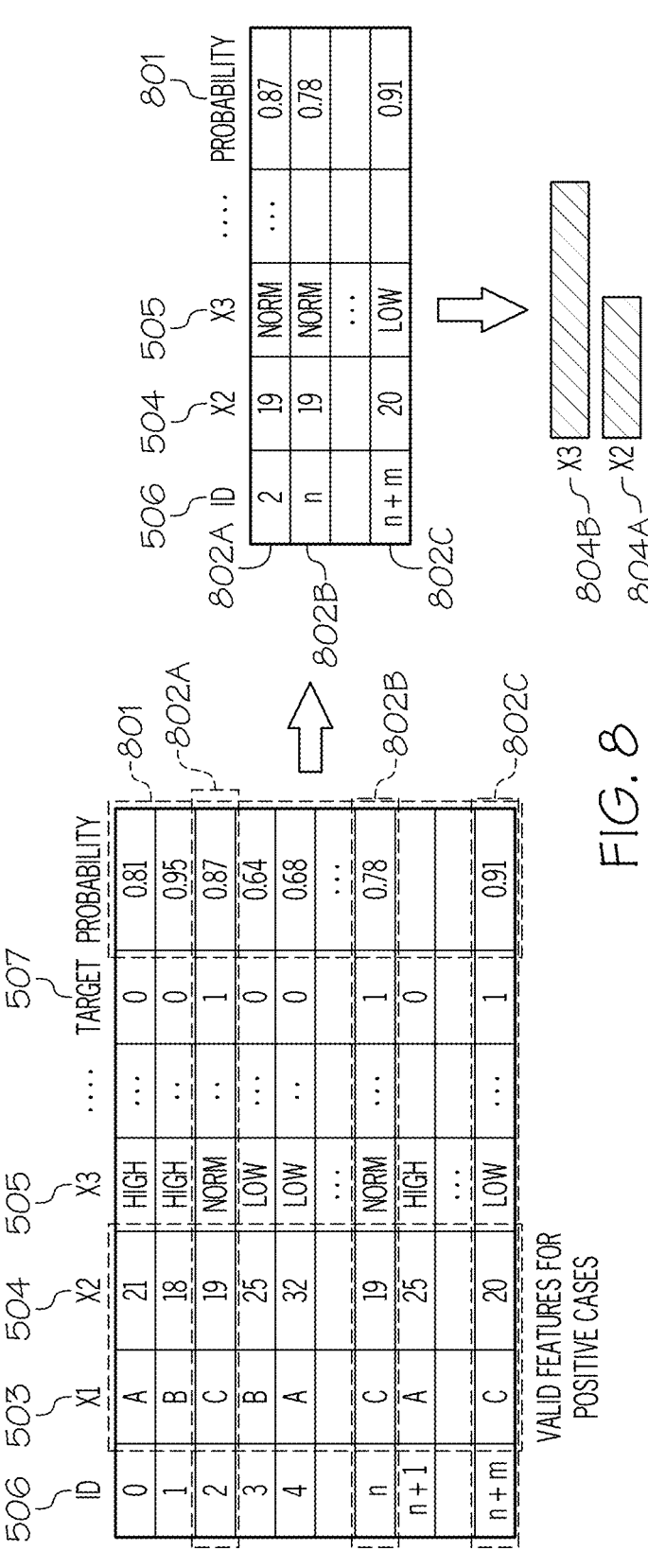
FIG. 8 illustrates the predictor importance values of the selected features calculated by a regression model using the features' original values for the positive cases and the prediction probability values in accordance with an embodiment of the present disclosure.
Figure 9:
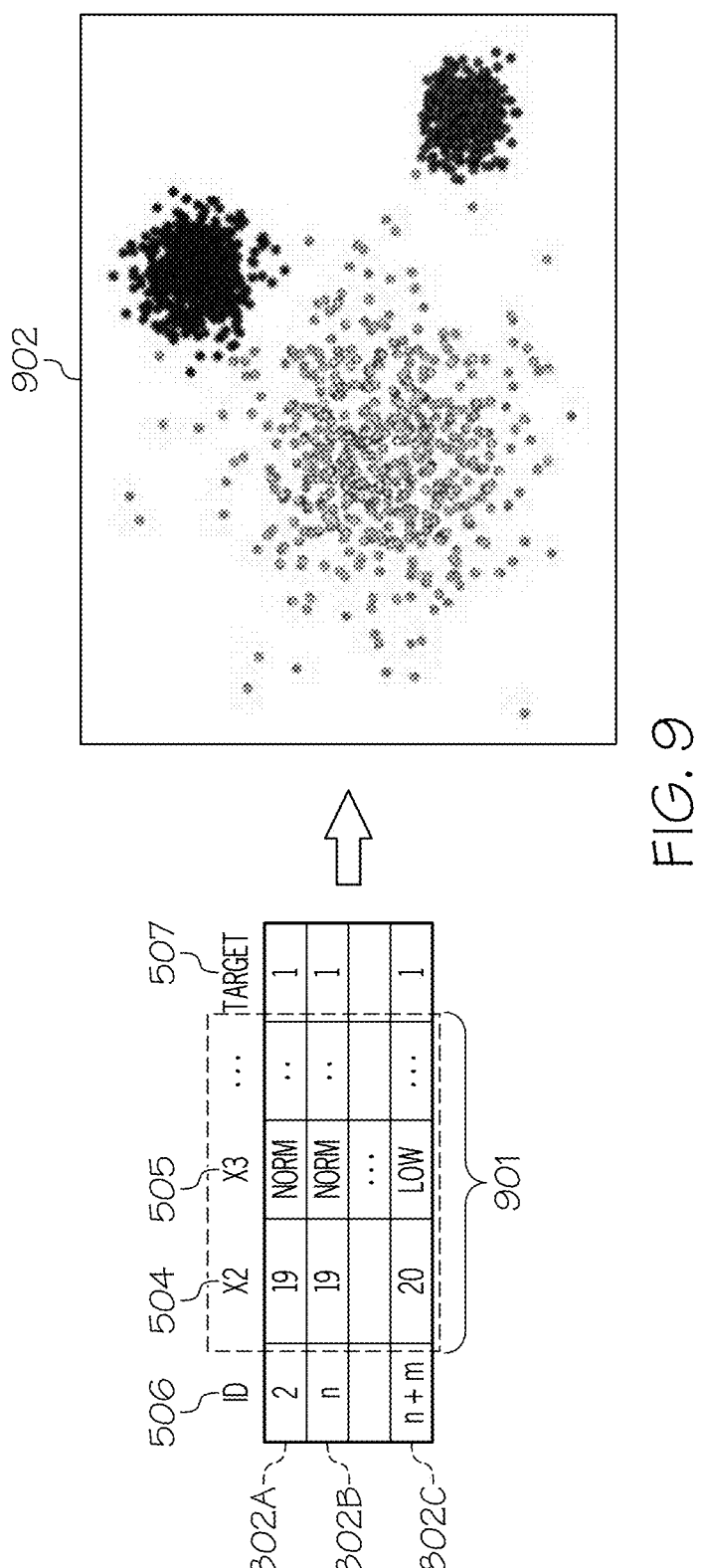
FIG. 9 illustrates clustering the positive cases generated by the selected classification model into a group with those features with a predictor importance value exceeding a threshold value in accordance with an embodiment of the present disclosure.

The embodiments of the present disclosure provide a means for accurately detecting the feature traits of a group, such as the traits of customers with high net worth, as discussed below in connection with FIGS. 4A-4B and 5-9. FIGS. 4A-4B are a flowchart of a method for detecting feature traits from an imbalanced dataset. FIG. 5 illustrates comparing the recall rate for the various built classification models and selecting the classification model with the highest recall rate to be used for predictive analysis. FIG. 6 illustrates the weights (contribution scores) assigned to the features by the regression model. FIG. 7 illustrates the contribution scores for various features for the positive cases. FIG. 8 illustrates the predictor importance values of the selected features calculated by a regression model using the features' original values for the positive cases and the prediction probability values. FIG. 9 illustrates clustering the positive cases generated by the selected classification model into a group with those features with a predictor importance value exceeding a threshold value.

As stated above, FIGS. 4A-4B are a flowchart of a method 400 for detecting feature traits from an imbalanced dataset in accordance with an embodiment of the present disclosure.

Referring to FIG. 4A, in conjunction with FIGS. 1-3, in operation 401, classification tool 201 of detector 101 builds classification models to predict a value of an outcome by simulating imbalanced dataset 102.

As discussed above, various types of classification models may be built by classification tool 201, such as logistic regression, naïve Bayes, stochastic gradient descent, k-nearest neighbors, decision tree, random forest and support vector machine. In one embodiment, the built classification models include a deep learning model, such as a convolutional neural network. In one embodiment, the built classification models include an ensemble model, such as XGBoost, random forest, etc. In one embodiment, the built classification models include a traditional classification model, such as support vector machine, trees, etc. In one embodiment, the built classification models include a composite model, such as a decision tree with logistic regression, support vector machine with a generalized linear mixed model, etc.

In one embodiment, one of the built classification models will be selected to provide prediction probability values. A prediction probability value, as used herein, refers to a value that indicates the probability of the target being a positive or a negative case (e.g., having a value of one which signifies a high net worth individual or having a value of zero which indicates that the individual is not a high net worth individual, respectively) based on the values of the selected features, such as the values of the selected inputs which represent various features (e.g., credit rating, home ownership, real estate owned, married).

In one embodiment, the goal of the selected classification model is to accurately predict the target class for each case in the dataset. For example, the selected classification model could be used to identify targets as being high net worth individuals (value of "1") or not high net worth individuals (value of "0").

In one embodiment, a classification task begins with a dataset in which the class assignments are known. For example, a classification model may predict high net worth individuals based on observed data over a period of time, such as loan information, historical credit rating, employment history, home ownership or rental, years of residence, number and type of investments, etc.

In one embodiment, the classification problem solved by the selected classification model is binary classification. In binary classification, the target attribute has only two possible values: for example, the target being a high net worth individual (value of "1") or not a high net worth individuals (value of "0").

In one embodiment, the built classification models receive input values of categorical variables and continuous variables (discussed further below) to predict target values, where the input values are adjusted to increase balancing of target values.

In operation 402, selector 202 of detector 101 compares the recall rate among the built classification models. As discussed above, a "recall rate," as used herein, corresponds to a number of correct positive predictions divided by a total number of positives (positive cases). For example, the recall rate=(TP/(TP+FN)), where TP corresponds to the number of true positives and FN corresponds to the number of false negatives. A "true positive" refers to a positive result (positive case) that is correctly classified and "false negative" refers to a negative result (negative case) that is incorrectly classified.

In operation 403, selector 202 of detector 101 selects the classification model among the built classification models with the highest recall rate to be used for predictive analysis (provide prediction probability values as discussed below) as shown in FIG. 5.

Referring to FIG. 5, FIG. 5 illustrates comparing the recall rate for the various built classification models and selecting the classification model with the highest recall rate to be used for predictive analysis in accordance with an embodiment of the present disclosure.

As shown in FIG. 5, training data (values) 501 and testing data (values) 502 for features X1 503, X2 504, X3 505, etc. are inputted into various classification models. Various combinations of these values for features X1 503, X2 504, X3 505, etc. are inputted for each training or testing dataset (from imbalanced dataset) identified by an identifier (ID) 506. After each training or testing dataset is inputted into the classification model, an output (target value) is predicted for the target 507. In one embodiment, target 507 represents whether the values for the combination of features (e.g., X1 503, X2 504, X3 505, etc.) for a particular set of training or testing data results in identifying a high net worth individual, which may be represented as a "1" for the target. In contrast, a "0" for the target indicates that a high net worth individual was not identified.

As previously discussed, the recall rate for each classification model (see exemplary list of classification models 508) is determined, and the classification model with the highest recall rate is selected (see exemplary selected classification model 509) to be used for predictive analysis (discussed below in further detail).

In one embodiment, the input data consists of categorical variables, in which categories of data are divided into two sets according to whether the new case (new set of training or testing data) has the same prediction as the original case (original set of training or testing data). In one embodiment, a value is randomly selected in each set of training or testing data and ensuring that the simulation rate for multiple sets is equal.

In one embodiment, the input data consists of continuous variables, in which the value of the variable is continuously updated within an interval of values. In one embodiment, such a value is determined using the perturbation function, such as by performing the perturbation function on a sample value in an interval of values (e.g., between 0 and 1).

Returning to FIG. 4A, in conjunction with FIGS. 1-3 and 5, in operation 404, regression analysis tool 203 of detector 101 builds a regression model based on a simulated dataset (simulated dataset around the positive case being analyzed) to compute the contribution of the features (e.g., X1 503, X2, 504, X3 505) to make the target a positive case, where the features are assigned contribution scores.

As discussed above, a "regression model," as used herein, refers to a model to perform regression analysis, which is a set of statistical processes for estimating the relationships between a dependent variable (the outcome variable, such as the target) and the one or more independent variables (often called "predictors," "covariates," or "features"). In one embodiment, the dependent variable corresponds to the "target," which, in one example, corresponds to an indication as to whether the individual is a high net worth individual (value of "1") or not (value of "0"). In one embodiment, the independent variables correspond to various features, such as loan information, historical credit rating, employment history, home ownership or rental, years of residence, number and type of investments, etc. that are used to determine whether there is a positive case (e.g., target having a value of "1" to indicate that the individual is a high net worth individual).

As also discussed above, regression analysis tool 203 builds a regression model based on the simulated dataset to compute the contribution of the features (e.g., X1 503, X2, 504, X3 505) to make the target a positive case. In one embodiment, the selected classification model (selected in operation 403) is used to predict the target value with a simulated input feature value. The simulated feature values and the predicted target may then be used to build a regression model to compute the feature's contribution to the positive case.

For example, 5,000-10,000 records may be simulated based on the positive case. If a feature of an input to the regression model is a categorical variable, then the input value is simply divided into two sets. Random values for the feature in each set are randomly selected. In one embodiment, the simulation rate for the two sets are equal. For instance, the value of the feature in one set is replaced with a value of a feature in the other set while the values of the other features are maintained for the positive case. The selected classification model (selected in operation 403) then generates the prediction value for the case, which becomes negative. Conversely, the value of the feature in the set is replaced with a value of the feature in the other set while the values of the other features are maintained for the positive case. The selected classification model then generates the prediction value for the case, which remains positive.

If, however, the input feature is a continuous variable, then an interval of the continuous input value is computed so that the feature value is replaced with any value in the interval while the other feature values remain unchanged for the case. The selected classification model (selected in operation 403) then generates the prediction value for the case which remains positive if the feature value is replaced with a value in the interval of the continuous input value. However, if the feature value is replaced with a value outside the interval of the continuous input value, then the prediction value for the case becomes negative.

In one embodiment, the regression analysis corresponds to linear regression, which corresponds to a linear approach to modeling the relationship between a scalar response and explanatory variables (dependent and independent variables).

In one embodiment, the regression analysis performed by the regression model is configured to maximize prediction accuracy. As a result, weights (contribution scores) are assigned to each independent variable (feature) in the model that are relative to the other independent variables in the analysis. In such a regression analysis, the regression analysis corresponds to a multiple regression analysis in which several independent variables (features) in combination are used to predict or explain the outcome dependent variable (the target). In one embodiment, the weights (contribution scores) correspond to a value between 0 and 1 as illustrated in FIG. 6.

Referring to FIG. 6, FIG. 6 illustrates the weights (contribution scores) assigned to the features (e.g., X1 503, X2 504, X3 505) by the regression model in accordance with an embodiment of the present disclosure.

As illustrated in FIG. 6, the regression model assigned the contribution scores of 0.263 and 0.3321 to features X1 503 and X2 504, respectively, as shown in element 601 for the combination of feature values associated with the identifier 506 of ID 2. That is, the regression model indicates that the value of feature X1 503 contributed 26.3% to having the target 507 become a positive case (e.g., having the target have a value of "1" to indicate that the individual is a high net worth individual) and that the value of feature X2 504 contributed 33.21% to having the target 507 become a positive case.

Returning to FIG. 4A, in conjunction with FIGS. 1-3 and 5-6, in operation 405, selector 202 of detector 101 selects those features with contribution scores exceeding a threshold value, which may be user-selected, for the positive cases as shown in FIG. 7.

FIG. 7 illustrates the contribution scores for various features (e.g., X1 503, X2 504, X3 505) for the positive cases (e.g., target 507 having a value of "1") in accordance with an embodiment of the present disclosure. Referring to FIG. 7, in one embodiment, training or testing datasets 701A-701C, identified with the identifiers 506 of 2, n and n+m, respectively, are selected by selector 202 as corresponding to positive cases (e.g., target 507 having a value of "1"). The contribution scores of such features (e.g., X1 503, X2 504, X3 505) are compared against a threshold value (e.g., 0.20) by selector 202. In one embodiment, selector 202 selects those features (e.g., X1 503, X2 504, X3 505) that contain a contribution value that exceeds a threshold value for any of the training or testing datasets 701A-701C for the positive cases. For example, if the threshold value is 0.20, features X1 503, X2 504 and X3 505 would be selected since at least one of the contribution values for these features for any of the training or testing datasets 701A-701C exceeds the threshold value is 0.20.

In another embodiment, selector 202 selects only those features (e.g., X1 503, X2 504, X3 505) that contain a contribution value that exceeds a threshold value for the majority of the training or testing datasets 701A-701C for the positive cases. In another embodiment, selector 202 selects only those features (e.g., X1 503, X2 504, X3 505) that contain a contribution value that exceeds a threshold value for a user-designated percentage of the training or testing datasets 701A-701C for the positive cases. In another embodiment, selector 202 selects only those features (e.g., X1 503, X2 504, X3 505) that contain a contribution value that exceeds a threshold value for each and every training or testing dataset 701A-701C for the positive cases.

In one embodiment, the input feature's contribution (contribution value) may be different for different positive cases. As a result, the average value of the feature's contributions (contribution values) is computed. In one embodiment, those features with a contribution value corresponding to the average value of the feature's contributions that exceeds a threshold value, which may be user-selected, is selected in operation 405.

Returning to FIG. 4A, in conjunction with FIGS. 1-3 and 5-7, in operation 406, selector 202 of detector 101 determines the variance in the features' original values for each feature of those selected features (selected in operation 405, such as X1 503, X2 504 and X3 505) between the positive and negative cases (e.g., cases in which target 507 is "1" and cases in which target 507 is "0," respectively). For example, if the original value of feature X2 504 for the positive case (e.g., target 507 having the value of "1") corresponds to 0.312 and the original value of feature X2 504 for the negative case (e.g., target 507 having the value of "0") corresponds to 0.022, then the variance (difference) between the original values for such positive and negative cases corresponds to 0.29 (0.312-0.022).

In operation 407, selector 202 of detector 101 selects those features out of the features selected in operation 405 (e.g., X1 503, X2 504 and X3 505) that have a variance in the features' original values between the positive and negative cases that exceeds a threshold value, which may be user-selected.

For example, if the variance (difference) between the original values for feature X2 504 for the positive and negative cases corresponds to 0.29 (0.312-0.022), then such a value is compared to a threshold value (e.g., 0.20). If the variance exceeds such a threshold value, then such a feature is selected.

In one embodiment, such a feature (e.g., X2 504) is selected as long as the variance in the original values between the positive and negative cases for at least one training or testing dataset exceeds such a threshold value. In another embodiment, such a feature (e.g., X2 504) is selected as long as the variance in the original values between the positive and negative cases for the majority of the training or testing datasets exceeds such a threshold value. In another embodiment, such a feature (e.g., X2 504) is selected as long as the variance in the original values between the positive and negative cases for a user-designated percentage of the training or testing datasets exceeds such a threshold value. In a further embodiment, such a feature (e.g., X2 504) is selected as long as the variance in the original values between the positive and negative cases for each and every training or testing dataset exceeds such a threshold value.

In operation 408, the selected classification model (selected in operation 403) generates prediction probability values for predicting a positive case using the values (original values in the imbalanced dataset) of the features selected in operation 407.

As discussed above, a prediction probability value, as used herein, refers to a value that indicates the probability of the target being a positive or a negative case (e.g., having a value of one which signifies a high net worth individual or having a value of zero which indicates that the individual is not a high net worth individual, respectively) based on the values of the selected features, such as the values of the selected inputs which represent various features (e.g., credit rating, home ownership, real estate owned, married) as shown in FIG. 8.

FIG. 8 illustrates the predictor importance values of the selected features calculated by a regression model using the features' original values for the positive cases and the prediction probability values in accordance with an embodiment of the present disclosure.

Referring to FIG. 8, the selected classification model generates prediction probability values 801 for each of the training and testing data sets. For example, the training dataset associated with identifier 506 of ID1 has a prediction probability value of 0.95, which corresponds to a 95% probability of having the value of target 507 corresponding to a value of "0" when feature X1 503 has the value of "B," feature X2 504 has the value of 18, feature X3 505 has the value of "high," etc. In another example, the training dataset associated with identifier 506 of ID2 has a prediction probability value of 0.87, which corresponds to a 87% probability of having the value of target 507 corresponding to a value of "1" when feature X1 503 has the value of "C," feature X2 504 has the value of 19, feature X3 505 has the value of "norm," etc.

Returning to FIG. 4A, in conjunction with FIGS. 1-3 and 5-8, in operation 409, regression analysis tool 203 of detector 101 builds a regression model to obtain an importance order (calculate a predictor importance value) for the selected features (those selected in operation 407) using the original values (from the imbalanced dataset, such as the training data 501 and testing data 502) of the selected features (those selected in operation 407) for the positive cases and the prediction probability values as shown in FIG. 8.

As discussed above, regression analysis tool 203 is configured to build a regression model to calculate a predictor importance ("PI") value of the selected features using the features' original values for the positive cases (e.g., cases that indicate the target having a value of "1" which corresponds to a high net worth individual) and prediction probability values (discussed above). A "predictor importance value," as used herein, refers to a value corresponding to the importance of the feature in predicting an outcome. In one embodiment, such a value is normalized between the values of 0 and 1.

In one embodiment, regression analysis tool 203 utilizes the IBM® SPSS Modeler to calculate the predictor importance value of the selected features using the features' original values (e.g., training data, testing data) for the positive cases (e.g., cases that indicate the target having a value of "1" which corresponds to a high net worth individual) and prediction probability values (discussed above).

Referring to FIG. 8, the original values of the selected features (features selected in operation 407, such as X2 504 and X3 505) for the positive cases 802A-802C along with their associated prediction probability values are used by the regression model to provide a predictor importance value 804A-804B of such selected features, X2 504 and X3 505, respectively, that corresponds to the importance of the feature in making a prediction. As shown in FIG. 8, importance value 804B of feature X3 505 is greater than importance value 804A of feature X2 504, thereby indicating that feature X3 505 has a greater importance in making a prediction than feature X2 504.

Referring now to FIG. 4B, in conjunction with FIGS. 1-3 and 5-8, in operation 410, cluster analysis tool 204 of detector 101 clusters the positive cases generated by the selected classification model into a group based on the predictor importance values of the selected features (selected in operation 407). For example, those features having a predictor importance value exceeding a threshold value would be selected as the input features for the cluster algorithm.

As discussed above, cluster analysis or clustering, as used herein, is the task of grouping a set of features with a predictor importance value that exceeds a threshold value in such a way that the features in the same group (called a cluster) are used to provide a positive case (e.g., target having a value of "1," which indicates a high net worth individual). In one embodiment, cluster analysis tool 204 utilizes any of the following clustering techniques to cluster the positive cases of the selected classification model into a group using those features with a predictor importance value exceeding a threshold value as inputs, such as hierarchical clustering, centroid-based clustering, distribution-based clustering, density-based clustering, and grid-based clustering.

In one embodiment, cluster analysis tool 204 utilizes a clustering algorithm that clusters those features with a predictor importance value exceeding a threshold value. In one embodiment, such a clustering algorithm is one or more of the following: affinity propagation, agglomerative clustering, BIRCH (Balanced Iterative Reducing and Clustering using Hierarchies), k-means, mean shift, spectral clustering, OPTICS (Ordering Points To Identify the Clustering Structure), etc.

An example of clustering the positive cases generated by the selected classification model into a group using those features with a predictor importance value exceeding a threshold value is shown in FIG. 9. FIG. 9 illustrates clustering the positive cases generated by the selected classification model into a group with those features with a predictor importance value exceeding a threshold value in accordance with an embodiment of the present disclosure.

Referring to FIG. 9, cluster analysis tool 204 utilizes a clustering algorithm to cluster the selected features of X2 504 and X3 505 (selected in operation 407) with a predictor importance value exceeding a threshold value for those positive cases 802A, 802B and 802C into a group 901.

Returning to FIG. 4B, in conjunction with FIGS. 1-3 and 5-9, in operation 411, extractor tool 205 of detector 101 extracts the feature traits from the group.

For example, the selected feature traits correspond to the traits of those features (features selected in operation 407) with a predictor importance value exceeding a threshold value, such as the traits (e.g., credit scores) for such features (e.g., credit rating). Other feature traits include, but not limited to, loan information, historical credit rating, employment history, home ownership or rental, years of residence, number and type of investments, etc. Such information may be extracted from those features (features selected in operation 407) with a predictor importance value exceeding a threshold value, which is used to provide detailed information about the target (e.g., high net worth individual), which is illustrated in FIG. 9 as element 902. Such information (feature traits) may be summarized in a summary that is provided to a user of detector 101 by extractor tool 205. For example, such information may be presented graphically to the user, such as via the display of detector 101.

In operation 412, extractor tool 205 of detector 101 generates a summary of the extracted feature traits for the group of clustered positive cases. As discussed above, extractor tool 205 utilizes a data visualization tool for converting the extracted feature traits into a graphic format (e.g., charts, tables, graphs, maps, infographics, dashboards, etc.). Examples of such a data visualization tool include, but not limited to, Tableau®, Looker®, IBM® Cognos Analytics, Sisense®, Microsoft® Power BI®, Domo®, etc.

Furthermore, after such information is provided to the user of detector 101, such information may be utilized by a marketing department to develop a marketing strategy to more effectively target high net worth individuals. In one embodiment, extractor tool 205 utilizes a marketing planning tool, such as Trello®, Wrike®, IBM® Marketing Cloud, Percolate®, SendX, Husky Marketing Planner, Mediatool, etc., to develop a marketing strategy using such information.

In this manner, the feature traits of a group, such as the traits of customers with high net worth, are more accurately detected using the principles of the present disclosure.

As a result of the foregoing, embodiments of the present disclosure provide a means for accurately detecting the feature traits of a group.

Furthermore, the principles of the present disclosure improve the technology or technical field involving machine learning. As discussed above, currently, classification algorithms are built to attempt to detect the feature traits of a group, such as the traits of customers with high net worth. In such classification algorithms, the feature with the highest predictor importance value (value corresponding to the importance in predicting an outcome) is selected as corresponding to the feature trait of the group. Such information is valuable, such as to marketing, in attempting to identify and target customers with high net worth to purchase a good or service. Unfortunately, such classification algorithms have a low recall rate (referring to the number of correct positive predictions divided by the total number of positive cases). As a result, the classification algorithms are unsuccessful in correctly identifying the feature traits of a group.

Furthermore, such predictor importance values do not focus on the accuracy of the contribution of the feature in predicting the outcome, such as the traits for making a customer a high net worth customer. Consequently, current classification algorithms fail to accurately detect the feature traits of a group, such as the traits of customers with high net worth.

Embodiments of the present disclosure improve such technology by building a first regression model based on a simulated dataset to compute the contribution of the features to make a target a positive case (e.g., target has a value of "1"), where the features are assigned contribution scores. A "regression model," as used herein, refers to a model to perform regression analysis, which is a set of statistical processes for estimating the relationships between a dependent variable (the outcome variable, such as the target) and the one or more independent variables (often called "predictors," "covariates," or "features"). In one embodiment, weights (contribution scores) are assigned to each independent variable (features) in the model that are relative to the other independent variables in the analysis. Those features with contribution scores for positive cases that exceed a threshold value are then selected ("first set of selected features"). The variance in the features' original values for each feature of those selected features ("first set of selected features") between the positive and negative cases is determined. Those features that have a variance in the features' original values between the positive and negative cases that exceeds a threshold value are then selected ("second set of selected features"). Prediction probability values are then generated by a classification model that was selected as having the highest recall rate using the values of the second set of selected features. A prediction probability value, as used herein, refers to a value that indicates the probability of the target being a positive or a negative case (e.g., having a value of one which signifies a high net worth individual or having a value of zero which indicates that the individual is not a high net worth individual, respectively) based on the values of the selected features, such as the values of the selected inputs which represent various features (e.g., credit rating, home ownership, real estate owned, married). A second regression model is then built to calculate a predictor importance value for the second set of selected features using the features' original values for those positive cases as well as the prediction probability values. A "predictor importance value," as used herein, refers to a value corresponding to the importance of the feature in predicting an outcome. Feature traits are then extracted from a group of clustered positive cases with the features of the second set of selected features containing a predictor importance value exceeding a threshold value. For example, the extracted feature traits correspond to the traits of those features of the second set of selected features with a predictor importance value exceeding a threshold value, such as the traits (e.g., credit scores) for such features (e.g., credit rating). Such extracted information is used to provide detailed information about the target (e.g., high net worth individual). A summary of the extracted feature traits of the group is then generated. After such information is provided to a user, such information may be utilized by a marketing department to develop a marketing strategy, such as to more effectively target high net worth individuals. In this manner, feature traits of a group, such as the traits of customers with high net worth, are more accurately detected. Furthermore, in this manner, there is an improvement in the technical field involving machine learning.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for detecting feature traits from an imbalanced dataset, the method comprising:
   building a first regression model based on a simulated dataset to compute contribution of features to make a target a positive case, wherein said features are assigned contribution scores;
   selecting a first set of features with contribution scores exceeding a first threshold value for positive cases;
   determining a variance in features' original values for each feature of said first set of features between positive and negative cases;
   selecting a second set of features corresponding to those features of said first set of features with a variance in original values between said positive and negative cases that exceeds a second threshold value;
   generating prediction probability values by a classification model for predicting a positive case using values of said selected second set of features;
   building a second regression model to calculate a predictor importance value for said selected second set of features using original values of said selected second set of features for said positive cases and said prediction probability values;
   extracting feature traits from a group of clustered positive cases with features of said selected second set of features containing a predictor importance value exceeding a third threshold value; and
   generating a summary of said extracted feature traits for said group of clustered positive cases.

2. The method as recited in claim 1 further comprising:
   building classification models to predict a value of an outcome by simulating said imbalanced dataset; and
   comparing a recall rate among said classification models, wherein said recall rate corresponds to a number of correct positive predictions divided by a total number of positive cases.

3. The method as recited in claim 2 further comprising:
   selecting one of said classification models with a highest recall rate to be used for predictive analysis.

4. The method as recited in claim 3 further comprising:
   clustering positive cases generated by said selected classification model into said group based on said predictor importance values for said selected second set of features.

5. The method as recited in claim 4, wherein said clustering is performed using one or more techniques selected from the group consisting of:
   hierarchical clustering, fuzzy clustering, density-based clustering and model-based clustering.

6. The method as recited in claim 2, wherein said classification models receive input values of categorical variables in which categories of data are divided into two sets according to whether a new case has a same prediction as an original case and continuous variables in which a value of a variable is continuously updated within an interval of values to predict target values, wherein said input values are adjusted to increase balancing of target values, wherein said value of said variable is determined using a perturbation function.

7. The method as recited in claim 1, wherein a marketing strategy is developed based on said extracted feature traits.

8. A computer program product for detecting feature traits from an imbalanced dataset, the computer program product comprising one or more computer readable storage mediums having program code embodied therewith, the program code comprising programming instructions for:
   building a first regression model based on a simulated dataset to compute contribution of features to make a target a positive case, wherein said features are assigned contribution scores;
   selecting a first set of features with contribution scores exceeding a first threshold value for positive cases;
   determining a variance in features' original values for each feature of said first set of features between positive and negative cases;
   selecting a second set of features corresponding to those features of said first set of features with a variance in original values between said positive and negative cases that exceeds a second threshold value;
   generating prediction probability values by a classification model for predicting a positive case using values of said selected second set of features;
   building a second regression model to calculate a predictor importance value for said selected second set of features using original values of said selected second set of features for said positive cases and said prediction probability values;
   extracting feature traits from a group of clustered positive cases with features of said selected second set of features containing a predictor importance value exceeding a third threshold value; and
   generating a summary of said extracted feature traits for said group of clustered positive cases.

9. The computer program product as recited in claim 8, wherein the program code further comprises the programming instructions for:
   building classification models to predict a value of an outcome by simulating said imbalanced dataset; and
   comparing a recall rate among said classification models, wherein said recall rate corresponds to a number of correct positive predictions divided by a total number of positive cases.

10. The computer program product as recited in claim 9, wherein the program code further comprises the programming instructions for:
   selecting one of said classification models with a highest recall rate to be used for predictive analysis.

11. The computer program product as recited in claim 10, wherein the program code further comprises the programming instructions for:
   clustering positive cases generated by said selected classification model into said group based on said predictor importance values for said selected second set of features.

12. The computer program product as recited in claim 11, wherein said clustering is performed using one or more techniques selected from the group consisting of: hierarchical clustering, fuzzy clustering, density-based clustering and model-based clustering.

13. The computer program product as recited in claim 9, wherein said classification models receive input values of categorical variables in which categories of data are divided into two sets according to whether a new case has a same prediction as an original case and continuous variables in which a value of a variable is continuously updated within an interval of values to predict target values, wherein said input values are adjusted to increase balancing of target values, wherein said value of said variable is determined using a perturbation function.

14. The computer program product as recited in claim 8, wherein a marketing strategy is developed based on said extracted feature traits.

15. A system, comprising:

a memory for storing a computer program for detecting feature traits from an imbalanced dataset; and a processor connected to said memory, wherein said processor is configured to execute program instructions of the computer program comprising:

building a first regression model based on a simulated dataset to compute contribution of features to make a target a positive case, wherein said features are assigned contribution scores;

selecting a first set of features with contribution scores exceeding a first threshold value for positive cases;

determining a variance in features' original values for each feature of said first set of features between positive and negative cases;

selecting a second set of features corresponding to those features of said first set of features with a variance in original values between said positive and negative cases that exceeds a second threshold value;

generating prediction probability values by a classification model for predicting a positive case using values of said selected second set of features;

building a second regression model to calculate a predictor importance value for said selected second set of features using original values of said selected second set of features for said positive cases and said prediction probability values;

extracting feature traits from a group of clustered positive cases with features of said selected second set of features containing a predictor importance value exceeding a third threshold value; and generating a summary of said extracted feature traits for said group of clustered positive cases.

16. The system as recited in claim 15, wherein the program instructions of the computer program further comprise:

building classification models to predict a value of an outcome by simulating said imbalanced dataset; and comparing a recall rate among said classification models, wherein said recall rate corresponds to a number of correct positive predictions divided by a total number of positive cases.

17. The system as recited in claim 16, wherein the program instructions of the computer program further comprise:

selecting one of said classification models with a highest recall rate to be used for predictive analysis.

18. The system as recited in claim 17, wherein the program code further comprises the programming instructions for:

clustering positive cases generated by said selected classification model into said group based on said predictor importance values for said selected second set of features.

19. The system as recited in claim 18, wherein said clustering is performed using one or more techniques selected from the group consisting of:

hierarchical clustering, fuzzy clustering, density-based clustering and model-based clustering.

20. The system as recited in claim 16, wherein said classification models receive input values of categorical variables in which categories of data are divided into two sets according to whether a new case has a same prediction as an original case and continuous variables in which a value of a variable is continuously updated within an interval of values to predict target values, wherein said input values are adjusted to increase balancing of target values, wherein said value of said variable is determined using a perturbation function.

* * * * *